March 22, 1960    J. J. HIRSH    2,929,793
METHOD OF MAKING CLOSED CELL POLYVINYL CHLORIDE FOAM
Filed July 12, 1957
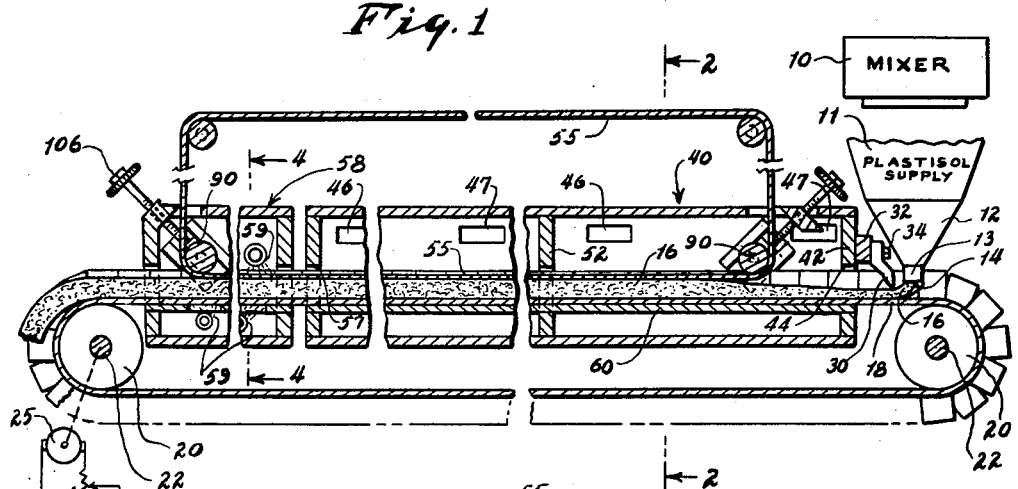
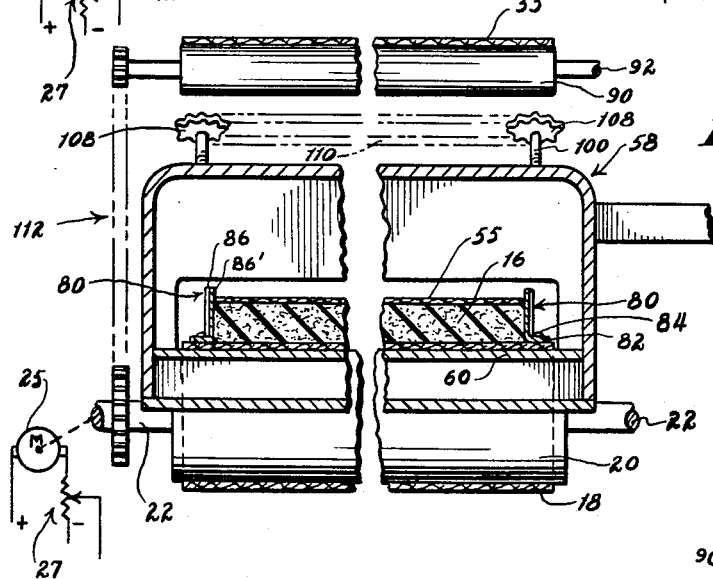
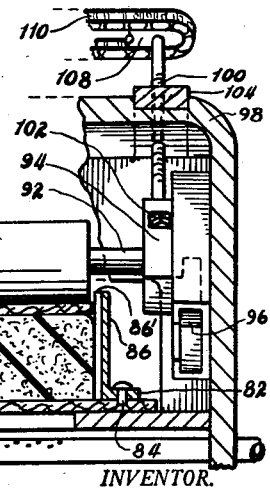
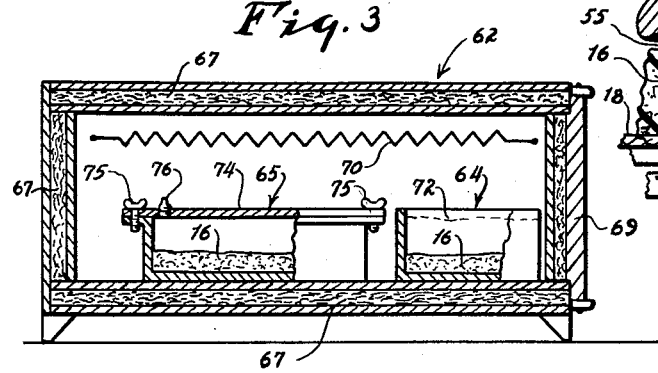
INVENTOR.
Joseph J. Hirsh
BY Emery, Varney,
Whittemore & Dix.
ATTORNEYS

2,929,793
METHOD OF MAKING CLOSED CELL POLYVINYL CHLORIDE FOAM

Joseph J. Hirsh, Bronx, N.Y.

Application July 12, 1957, Serial No. 671,664

9 Claims. (Cl. 260—2.5)

This invention relates to improvements in the manufacture of polyvinyl chloride foam, and more especially to foam having closed cells.

It is an object of the invention to provide a method of making polyvinyl chloride foam with closed cells in a more reliable and economical way than in the methods of the prior art. Some features of the invention relate to the formulation of the plastisol from which the foam is made, and other features relate to the way in which the plastisol is mixed and the way in which it is treated during the manufacturing of the foam.

Other objects, features and advantages of the invention will appear or be pointed out as the description proceeds.

In the drawing, forming a part hereof, in which like reference characters indicate corresponding parts in all the views:

Figure 1 is a diagrammatic sectional view showing apparatus for making polyvinyl chloride foam in accordance with this invention;

Figure 2 is a sectional view taken on the line 2—2 of Figure 1;

Figure 3 is a diagrammatic sectional view showing apparatus for making polyvinyl chloride foam in accordance with a modified form of the invention; and Figure 4 is a greatly enlarged sectional view taken on the line 4—4 of Figure 1.

The plastisol consists of a polyvinyl chloride, a resin, which may be either a polymer or a copolymer, of hard particles containing little or no emulsifying agent left in them as the result of the manufacturing process by which the polyvinyl chloride resin was produced. The resin is a dispersion, stir-in type of resin obtained by spray drying. The resin is also substantially free of moisture and in any event, should contain not over 1% of moisture. In practice, particularly good results have been obtained with the polyvinyl chloride resin sold by the Bakelite Corporation under the designation "QYNV."

This polyvinyl chloride resin has less emulsifying agent remaining in it. For the process and product of this invention, it is desirable to have the polyvinyl chloride contain as little as possible emulsifying agent remaining in it from the process by which the polyvinyl chloride was produced. The QYNV resin is approximately 98.8% vinyl chloride. The particle size is generally of the order of between 0.1 and 1.0 microns.

If the moisture content of the resin is greater than approximately one percent, it should be reduced to this value or lower moisture content by placing the resin in a drying oven. Heating the resin to a temperature of 130° F. overnight, or maintaining it at a temperature of 158° F. for about an hour, with the resin layer not over two inches thick, is sufficient to reduce the moisture content to one percent or less. This low moisture content is necessary to obtain closed cells of small size. Excessive moisture content results in the forming of open cells or even collapse of the foam.

In making up the plastisol for the foam of this invention, smaller cell sizes are obtained if the ingredients are mixed at temperatures lower than room temperature, and preferably between 40° and 60° F.; and at a relative humidity no higher than 35%. After mixing, the plastisol should be kept cool until used. It will remain in good condition for long periods of time if kept refrigerated at a temperature of 40° F. or lower. If allowed to remain at higher temperatures, solvation occurs with the result that the cell sizes become larger and eventually open cells occur.

The success of this invention, in producing unicellular foam small size cells for the particular formulation, seems to depend upon the production of a plastisol in which the polyvinyl chloride resin is not thoroughly wetted down by the plasticizer. It seems to be objectionable to have the resin absorb any substantial amount of plasticizer. The mixing of the plastisol at low temperatures reduces the absorption of plastisol by the resin, and a limiting of the intimacy of the mixing is also effective in reducing absorption. The use of a plasticizer of low solvation value also retards the general absorption.

The plastisol can be mixed in any conventional equipment, but is preferably mixed on a loose mill. After a preliminary dispersing of the ingredients in a paste mixer or Banbury mixer, a mixing on the mill by one or two passes through slightly spaced rolls is sufficient. Good results are obtained with a roll clearance of between .002 and .005 inches; but if the mill is tight with substantially less than this clearance, larger cell sizes are obtained in the foam made from the plastisol and this probably results from the more intimate mixing, or the heat resulting from the roll pressure, or both.

A number of different plasticizers are generally used in order to obtain foam having the desired physical characteristics. The plasticizers must be compatible with one another and with the other ingredients of the plastisol. The actual plasticizers used for this invention will be considered hereinafter in the explanation of the chemical formulae.

The blowing agent utilized in the present invention consists of BL–353 made by E. I. du Pont de Nemours & Company of Wilmington, Delaware. BL–353 contains approximately seventy percent N,N'-dimethyl-N,N'-dinitroso terephthalamide and thirty percent white mineral oil by weight. BL–353 is an odorless, yellow-colored, non-hygroscopic, crystalline powder which has an average basic particle size in the range of two to three microns, a bulk density of twenty-eight pounds per cubic foot, and a specific gravity of 1.2 grams per cubic centimeter. This blowing agent is described in detail at page 722 et seq. of the April 1957 issue of Industrial and Engineering Chemistry.

Figure 1 shows a general representation of a mixer 10 from which the plastisol is supplied to a container 11 having a hopper bottom 12 with a discharge outlet 13. A gate 14, hinged at one side to the discharge outlet 13, can be shifted into different positions to control the size of the outlet. Plastisol 16 flows from the discharge outlet 13 to a conveyor belt 18 located below the container 11.

The conveyor belt 18 is shown as an endless belt which runs over rollers 20 supported by axles 22 at opposite ends of the apparatus. The belt 18 moves continuously at a controlled speed. A motor 25 is shown diagrammatically as connected with one of the axles 22; and the speed of the motor 25 is regulated by a rheostat 27 which is merely representative of means for controlling the speed of the conveyor belt 18.

A strikeoff blade 30, located adjacent to the discharge outlet 13, is supported from a fixed frame 32. The strikeoff blade 30 is vertically adjustable to change its spacing from the conveyor belt 18. Clamping screws 34 hold the strikeoff blade 30 in any adjusted position, and these screws are released when the adjustment of the blade is to be changed.

The discharge outlet 13 is of generally rectangular cross-section and extends across most of the width of the conveyor belt 18. The thickness of the sheet of plastisol flows from the container 11 onto the conveyor belt 18 and is determined by the position of the gate 14; and a more accurate control of the thickness and its uniformity across the full width of the plastisol 16 is regulated by the setting of the strikeoff blade 30.

The plastisol is preferably of a consistency which will flow by gravity through the discharge outlet 13. If thicker or more viscous plastisols are used, pressure can be applied to the top surface of the plastisol in the container 11 by a piston or by gas pressure.

Beyond the strikeoff blade 30, the conveyor belt 18 carries the plastisol 16 into an oven or heating tunnel 40. The tunnel 40 has a front wall 42 with an entrance 44 through which the conveyor belt 18 and plastisol 16 travel into the tunnel. In the illustrated construction, the tunnel 40 is heated by hot air or hot products of combustion, or a mixture of the two, blown into the heating tunnel 40 through an inlet passage 46. The hot atmosphere, which is introduced through the passage 46 is exhausted from the tunnel 40 through a discharge passage 47. There are preferably similar inlet and discharge passages 46 and 47 on both sides of the furnace. If desired there may be a number of such passages on each side of the furnace. The tunnel can be heated in any other conventional way.

The temperature in the oven 40 is above the decomposition temperature of the blowing agent. As the blowing agent decomposes, the plastisol 16 is blown into a foam which is indicated also by the reference character 16. The plastisol is blown at atmospheric pressure. This is an important advantage in that it makes possible the manufacture of unicellular foam without resorting to closed molds capable of withstanding high pressure. By eliminating the necessity for such molds the dimensional limitations of the foam are removed. It is possible to make continuous sheeting of a width limited only by the width of the conveyor belt 18.

The tunnel 40 has a partition 52 which separates the inside of the tunnel into two separate compartments. This separation is for the purpose of obtaining different temperatures in different parts of the tunnel. In the compartment between the front wall 42 and the partition 52, the furnace is maintained at the desired temperature for blowing the plastisol. The actual temperature will be considered hereinafter in connection with the formulations.

Beyond the partition 52, the tunnel 40 is at a higher temperature for fusing the foam.

The speed of the conveyor belt 18 and the temperature in the tunnel 40 are correlated with the length of the tunnel between the front wall 42 and the partition 52 so as to obtain complete decomposition of the blowing agent and full expansion of the foam before the foam passes the partition 52 and enters the fusing compartment of the tunnel.

With this invention the cell walls form during the blowing step and the thickness of the walls is the same as they have in the final product because the foam is blown to its final expansion while the blowing agent is decomposing at a subfusing temperature. The blowing step is continued until the blowing agent is completely decomposed. If greater or lesser density of the foam is desired, this is obtained by changing the amount of blowing agent dispersed through the plastisol, or by other changes in the formulation.

The foam of this invention is unfused at the end of the blowing step. The expression "unfused" is used herein to designate a condition in which the foam is sticky, and unresilient so that any part of the foam which is pressed down will remain deformed and collapsed. If undisturbed, the blown and unfused foam will remain expanded, with no substantial change, for extended periods. In practice, batches of the foam have been kept as long as three days at room temperature and also at blowing temperature, before fusing without noticeable loss of gas or other change.

Foam 16 passes beyond the partition 52 into the fusing compartment of the tunnel. Fusing of the foam is necessary in order to obtain a resilient and stable product, for reasons well understood in the art. If the fusion is incomplete, the final foam undergoes certain objectionable changes with the passage of time, such as exudation and migration of the plasticizers.

The fusing temperature and the length of time required to complete the fusion depend to some extent upon the formula of the plastisol and the thickness of the foam. The temperature in the fusing compartment of the tunnel 40 is preferably at least 350° F. This fusing step of the invention is an operation well understood in the art.

While the foam 16 can travel through any desired length of the blowing compartment of the tunnel 40, it is a feature of the invention that the heating to fusing temperature, after being started, progresses quickly. Exposure to temperatures substantially above the blowing temperature but less than the fusing temperature will cause collapse of the foam if continued for a substantial period.

The end of the fusing compartment of the tunnel 40, near the partition 52, loses heat as a result of the continuous introduction of foam 16 of lower temperature than the atmosphere of the fusing compartment. Experience as shown that it is desirable to bring the oven atmosphere up to fusing temperature within about ten minutes.

Except when using radiant heating panels or dielectric heat, two kilowatts of electric power input for every three cubic feet of space within the fusing compartment of the tunnel 40, or any other oven such as may be used for batches of the foam, provides the necessary replacement of heat to maintain the desired temperature in the fusing compartment. The same two kilowatts of power of every three cubic feet of space is recommended for the blowing compartment, as well as for the fusing compartment of the tunnel.

The length of time required to fuse the foam depends also upon the thickness of the foam because the cells make the outer portion of the foam a heat insulator which delays the heating of the interior section of the foam. More rapid fusing and increased production are obtained by using radiant heating as disclosed in my copending patent application Serial No. 504,328, filed April 27, 1955, now abandoned, or by using dielectric heating, for either the blowing operation, or the fusing operation, or both.

In the illustrated apparatus there is a belt 55 in contact with the top surface of the foam 16 from a location in the blowing compartment of the tunnel and all the way through the fusing compartment of the tunnel, and through an opening 56 in an end wall 57, and into a cooling tunnel 58. The purpose and operation of this upper belt 55 will be described in connection with Figure 4. For the present it is sufficient to understand that it moves with the same speed as the conveyor belt 18 and that it rests upon the top surface of the foam.

As the foam travels through the cooling tunnel 58, the temperature of the foam is lowered by cooling air circulated through the tunnel or by cold water sprays 59 directed against the surface of the belts 18 and 55. In both the heating tunnel 40 and the cooling tunnel 58, the conveyor belt 18 rests upon a support 60 which prevents the belt from sagging. This support 60 has openings in it so that the atmosphere in the heating tunnel has direct contact with the lower surface of the conveyor belt at the regions at the openings, and cold air or water spray 59 has contact with the lower surface of the conveyor belt 18 in the cooling tunnel 58.

Figure 3 shows an oven 62 in which molds 64 and 65 are placed for heating them. The oven 62 is shown with heat insulated walls 67. It has a door 69 which can be opened whenever molds are to be placed in the oven or removed from the oven. The oven 62 is shown with an electric heating coil 70.

The mold 64 is open at its upper end. Plastisol 16 is placed in the mold 64. The mold 64 is placed in the oven with the temperature of the oven at the proper value for blowing the plastisol; and the plastisol 16 expands to fill the mold or bring it to a predetermined level indicated by the dotted line 72. The amount of plastisol originally placed in the mold 64 depends upon the formulation and particularly upon the amount of blowing agent. If the plastisol contains a large quantity of blowing agent, for making a foam of light density, then the original quantity of plastisol poured into the mold 64 is limited accordingly so that the mold will not overflow when the plastisol is fully expanded.

The mold 65 has a cover 74 secured to the mold by screws 75 which are merely representative of fastening means for holding the top on the mold 65. This closed mold 65 is used in the same way as the mold 64, or can be used to prevent overflow over the sides of the mold if the foam expands into contact with the cover 74. The mold 65 is preferably provided with a vent 76.

It will be understood that when the foam is made in batches, that is, by filling molds such as the molds 64 and 65, the heating and fusing can be performed in a tunnel oven, as shown in Figure 1; and the molds are carried through the tunnel oven on a conveyor which has its speed correlated with the temperatures of the tunnel compartments and with their lengths so as to obtain the necessary length of blow and fusing parts.

Figure 4 shows the construction of the conveyor belt 18 with a side wall 80 for preventing transverse spreading of the plastisol 16 on the belt.

The side wall 80 includes a plurality of blocks 82 secured to the belt 18 by rivets 84 at longitudinally spaced locations along the belt 18. Each of the blocks 82 has a fin 86 which is rigidly secured to, or of one piece construction with the block 82. These fins extend upwardly to a height somewhat greater than the maximum height of the foam for which the compartment is intended to be used. Alternate fins 86 are staggered so that they overlap one another. The next adjacent fin which has its outer face overlapping the inner face of the fin 86, in Figure 4, is indicated by the reference character 86'. This overlapping relation permits the fins to spread longitudinally as they travel around the rollers 40 (Figure 1), where the conveyor belt 18 reverses its direction of travel.

The upper belt 55 is supported by rollers 90, one of which is located in the tunnel 40, and the other of which is located in the cooling tunnel 58. Each of these rollers 90 is supported by an axle 92 which turns in a bearing block 94 (Figure 4).

The bearing block 94 is movable up and down in a guideway 96 attached to a side wall 98 of the cooling tunnel. The block 94 has a screw 100 connected to it by a collar 102, which is located in a slot through the block 94 for preventing relative movement of the block and screw in a direction lengthwise of the screw. The screw 100 screws through threaded elements 104 carried by the top wall of the tunnel. The upper end of the screw 100, above the top of the tunnel has a square end 106 for receiving a wrench by which the screw 100 is turned to adjust the height of the block 94 in the tunnel.

A sprocket 108 is secured to the upper end portion of the screw 100; and a chain 110 passes around the sprocket 108 and over to the other side of the tunnel where it passes around a similar sprocket at the upper end of the other screw for adjusting a bearing block on the opposite side of the tunnel.

At least one of the rollers 90 is driven from the motor 25. In the construction illustrated, this drive is obtained by a chain and sprocket connection 112 between the axles 22 and 92, as shown in Figure 2.

The height of the belt 55 above the conveyor belt 18 is adjusted by raising and lowering the bearing blocks 94 and the axle 92 which turns in these bearing blocks. This causes the roller 90 to move up and down with respect to the conveyor belt 18. In practice the belt 55 is adjusted so as to contact with the top surface of the foam for different thicknesses of foam or for different degrees of expansion of the foam. The contact of the belt 55 with the top surface of the foam ensures a smoother surface than when the foam expands with no surface in contact with the top of the foam.

In order to obtain closed cells, that is, unicellular foam, it is advisable to maintain the plastisol and the foam substantially free of acid.

In the research work which has been done on this invention, numerous chemical products have been used and some of those which give the best results are known only by their trade names. The actual chemical composition of the product is not available from the manufacturer. The portion of the specification which follows identifies the different ingredients of the plastisol by their chemical composition, where known, and for those products which are identified only by their trade names, the manufacturer is identified so that other persons can obtain the ingredients when making the product of this invention.

The principal ingredient of the plastisol is polyvinyl chloride which may be either a polymer or a co-polymer. As previously explained, polyvinyl chloride produced by the Bakelite Company, under the trade designation "QYNV," is a preferred resin for making the plastisol of this invention.

Properties of a superior batch of "QYNV" polyvinyl chloride resin are as follows:

Percent heat loss _____ 0.4.
Percent alcohol extractables __ 0.9.
Percent PVC _____ 98.7.
Initial viscosity _____ 115 poises.
One day viscosity _____ 235 poises.
Viscosity stability _____ 26%.
High shear viscosity _____ 1330 poises.
Percent dilatancy _____ 73.7%.
Specific viscosity _____ 0.309 (0.2% in nitrobenzene).
Viscosity on heating _____ 900 poises, 150° F.
Wetting (seconds) _____ 54.
Color development (fused film 20 minutes at 350° F.) ___ 7.3%.

Other polyvinyl chlorides can be used if they are substantially free of emulsifying agents, and have a very low moisture content and acid content. Best results are obtained if the polyvinyl chloride is hard and resistant to the absorption of the plasticizers in making up the plastisol.

The preferred plasticizers are Arochlor 1254, a chlorinated biphenyl having 54 weight percent of chlorine manufactured by the Monsanto Chemical Company; MPS 500, methylpentachlor stearate manufactured by the Hooker Electro Chemical Corporation of Niagara, N.Y.; Paraplex G 53, a linear poly ester type plasticizer of monobasic acids and polyhydroxy alcohols manufactured by Rohm & Haas of Philadelphia, Pa.; Paraplex G 62, an epoxidized soya oil plasticizer manufactured by Rohm & Haas; dioctyl phthalate; dioctyl sebacate; DIDOP (di-octyl-decyl-octyl-phthalate); Ohopex Q10, an octyl fatty phthalic acid ester, a plasticizer manufactured by the Ohio Apex Company; and Flexricin 66, an isobutyl acetyl ricinoleate sold by Baker Castor Oil Company of New York.

The amount of BL-353 blowing agent depends upon the intended density of the foam. If not uniformly dispersed through the plastisol, such as on a three roller differential mill, there will be a lack of uniformity in the cell sizes and uneven distribution of the cells in the finished foam. An increase in the amount of blowing agent causes a decrease in the density of the foam and a greater expansion of the plastisol upon blowing. If too much blowing agent is dispersed through the plastisol, the foam will expand excessively and some of the cells will be blown open into other cells so that the final product will contain a combination of both open and closed cell structure.

A heat stabilizer to prevent decomposition at the fusing temperature, is added to the plastisol. A lead stabilizer can be used such as dibasic lead phosphite $$(2PbOPbHPO_3, \tfrac{1}{2}H_2O)$$

This stabilizer is sold under the trade name Dyphos, by the National Lead Company. The other suitable lead stabilizer is dibasic lead stearate $$(2PbO-Pb(C_{17}H_{35}COO)_2)$$

This stabilizer is sold by the National Lead Company under the trade designation DS-207. Other heat stabilizers known to the art can be used instead of these lead stabilizers, such as tin barium and cadmium stabilizers.

Inert fillers can be added to extend the mixture; but substantial quantities of filler reduce the strength of the foam. Calcium carbonates are suitable fillers; also mica, talc and clay.

The foaming stage in the present invention may be conducted between about 180° F. and about 300° F. Temperatures below 180° F. are not practical because of the long foaming times that are required. Temperatures above 300° F. are not practical because of the higher densities of the resultant foam product that are obtained.

Fusion may be effected at a temperature of between about 350° F. to 375° F. Simultaneous foaming and fusion at a temperature of 350° F. is possible, but not desirable in most instances. By external heating methods, such as convection or radiant heating, it is possible to satisfactorily fuse foam up to a thickness of approximately two inches. By internal methods of heating such as dielectric heating, it is possible to satisfactorily fuse foams up to six or more inches in thickness. Combinations of internal and external heat provide optimum fusing conditions.

One example of a formulation made in accordance with this invention is as follows:

| Parts | Ingredients |
|---|---|
| 100 | polyvinyl chloride QYNV. |
| 30 | Paraplex G-53. |
| 25 | Paraplex G-62. |
| 80 | Chlorinated biphenyl (Arochlor 1254). |
| 35 | di-iso-decyl-octyl-phthalate. |
| 5 | dibasic lead phosphite (Dyphos). |
| 1 | dibasic lead stearate. |
| 8 | BL-353 (the amount of blowing agent may vary from 1 to 10 parts depending upon the desired density of the foam). |

To the above formula there may be added from 1 to 20 parts of filler for extending the foam; from 1 to 5 parts of antimony oxide for fireproofing; and from 1 to 3 parts of thickening agent for gelling the plastisol when it is to be discharged on a conveyor belt with a strikeoff blade for controlling the thickness of the sheet prior to blowing.

When a thickening agent is used, good results have been obtained with Thixcin, a bodying or gelling agent manufactured by the Baker Castor Oil Company. Other known thickening agents can be used, such as aluminum stearate, aluminum oleate, or other metallic soaps.

A plastisol made in accordance with the above formula can be fully expanded with complete decomposition of the blowing agent by subjecting the plastisol to a mold or oven temperature of about 260° to 275° F. for a period of approximately 30 to 45 minutes. No harm is done by leaving the foam at this temperature for a longer period, but shorter blowing time is likely to result in an incomplete decomposition of the blowing agent unless the section of the foam is very thin, or unless the heating is done by radiant heat that penetrates the foam. The use of radiant heat for blowing the plastisol, is described in my copending patent application, Serial No. 504,328, previously referred to. By the use of such radiant heating the foam can be completely expanded in from 1½ to 10 minutes, with 2" foam; and comparatively little additional time, if any, is required for extending thicker foam because the heat penetrates into the foam without requiring temperature gradients to produce heat flow by conduction through the material.

The foam made in accordance with the above example is fused at a temperature at about between 350° and 375° F. for a period of approximately 10 to 60 minutes, depending upon the thickness of the foam, when heating in the apparatus illustrated. Considerably shorter periods are sufficient when the foam is fused by dielectric heating or by radiant heat panels as disclosed in my patent application Serial No. 504,328, previously referred to.

A second illustrative formula for the polyvinyl chloride foam of this invention is as follows:

| Parts | Ingredients |
|---|---|
| 100 | polyvinyl chloride (QYNV). |
| 45 | Paraplex G-62. |
| 15 | chlorinated biphenyl (Arochlor 1254). |
| 5 | dibasic lead phosphite (Dyphos). |
| 1 | dibasic lead stearate (DS-207). |
| 25 | di-iso-decyl-octyl-phthalate. |
| 25 | MPS-500. |
| 8 | Flexricin 63. |
| 6 | dioctyl sebacate. |
| 10 | BL-353 (the amount of blowing agent can be varied from about 1 to 10 parts depending upon the intended density of the foam). |

As in the first illustrative example, 1 to 20 parts of filler can be added; 1 to 5 parts antimony oxide; and 1 to 3 parts of Thixcin, for the purposes previously explained.

This application is a continuation-in-part of my earlier filed and copending patent application Serial No. 513,814 filed June 7, 1955, now abandoned.

Variations and substitutes in the above formulae can be made in accordance with the teaching of this specification; and various changes and modifications can be made in the process, and the steps of the process can be used with different formulae without departing from the invention as defined in the claims.

I claim:

1. The method of making closed cell polyvinyl chloride foam which comprises making a plastisol by mixing polyvinyl chloride with a plasticizer and distributing a blowing agent comprising N,N'-dimethyl-N,N'-dinitroso terephthalamide through the plastisol, blowing the plastisol to its final expansion by completely decomposing the blowing agent while the plastisol is at atmospheric pressure maintaining the temperature of the plastisol below the fusing temperature of the polyvinyl chloride during the blowing step, and then raising the temperature of the resulting foam quickly to fusing temperature while maintaining the cells thereof closed.

2. A method in accordance with claim 1 in which the ingredients of the plastisol are mixed on a loose mill at a temperature of less than 70° F.

3. A method in accordance with claim 1 in which the polyvinyl chloride resin has a particle size of between 0.1 and 1.0 microns and is substantially devoid of all emulsifier and free acid.

4. A method in accordance with claim 1 in which the moisture content of the polyvinyl chloride resin is maintained below about one percent.

5. A method in accordance with claim 1 in which the plastisol is blown at a temperature of between about 180° F. and 300° F.

6. A method in accordance with claim 1 in which the plastisol is fused at a temperature of between about 350° F. to 375° F.

7. A method in accordance with claim 1 in which the plastisol is first blown at a temperature of between 180° F. and 300° F. and then fused at a temperature of between 350° F. and 375° F.

8. The method of making a closed cell polyvinyl chloride foam which comprises mixing one hundred parts of polyvinyl chloride resin, thirty parts of a plasticizer of a linear polyester of monobasic acids and polydroxy alcohols, twenty-five parts of a plasticizer of an epoxidized soya oil, eighty parts of a plasticizer consisting of a chlorinated biphenyl having fifty-four weight percent of chlorine, thirty-five parts of di-iso-decyl-octyl-phthalate, five parts of dibasic lead phosphite, one part of dibasic lead stearate, and eight parts of a blowing agent containing seventy percent N,N'-dimethyl-N,N'-dinitroso terephthalamide and thirty percent white mineral oil, blowing the plastisol resulting from the aforesaid mixture at a temperature of between 180° F. and 300° F. at atmospheric pressure for a sufficient length of time to completely decompose the N,N'-dimethyl-N,N'-dinitroso terephthalamide, and then subjecting the expanded foam to a higher temperature sufficient to fuse the polyvinyl chloride while maintaining the cells of the fused polyvinyl chloride closed.

9. The method of making a closed cell polyvinyl chloride foam which comprises mixing into a plastisol one hundred parts by weight of polyvinyl chloride resin, forty-five parts by weight of a plasticizer of an epoxidized soya oil, fifteen parts by weight of chlorinated biphenyl plasticizer having fifty-four weight percent of chlorine, five parts by weight of dibasic lead phosphite, one part by weight of dibasic lead stearate, twenty-five parts by weight of di-iso-decyl-octyl-phthalate, twenty-five parts by weight of methylpentachlor stearate, eight parts by weight of isobutyl acetyl ricinoleate, six parts by weight of dioctyl sebacate, and ten parts by weight of a blowing agent comprising seventy percent N,N-dimethyl-N, N'-dinitroso terephthalamide, subjecting the plastisol to a blowing temperature of about 180° F. to 300° F. while at substantially atmospheric pressure and for a sufficient length of time to completely decompose the N,N'-dimethyl-N,N'-dinitroso terephthalamide, and then subjecting the expanded foam to a higher temperature sufficient to fuse the polyvinyl chloride while maintaining the cells thereof closed.

References Cited in the file of this patent
UNITED STATES PATENTS

| | | |
|---|---|---|
| 2,176,945 | Roberts | Oct. 24, 1939 |
| 2,288,611 | De Wyk | July 7, 1942 |
| 2,525,880 | Feldman | Oct. 17, 1950 |
| 2,577,381 | Stirnemann | Dec. 4, 1951 |
| 2,589,537 | Carpentier | Mar. 18, 1952 |
| 2,737,503 | Sprague et al. | Mar. 6, 1956 |